Oct. 9, 1956     H. L. SCHMIERER     2,765,789
EYESHADE APPLICATOR
Filed Oct. 8, 1952     2 Sheets-Sheet 1
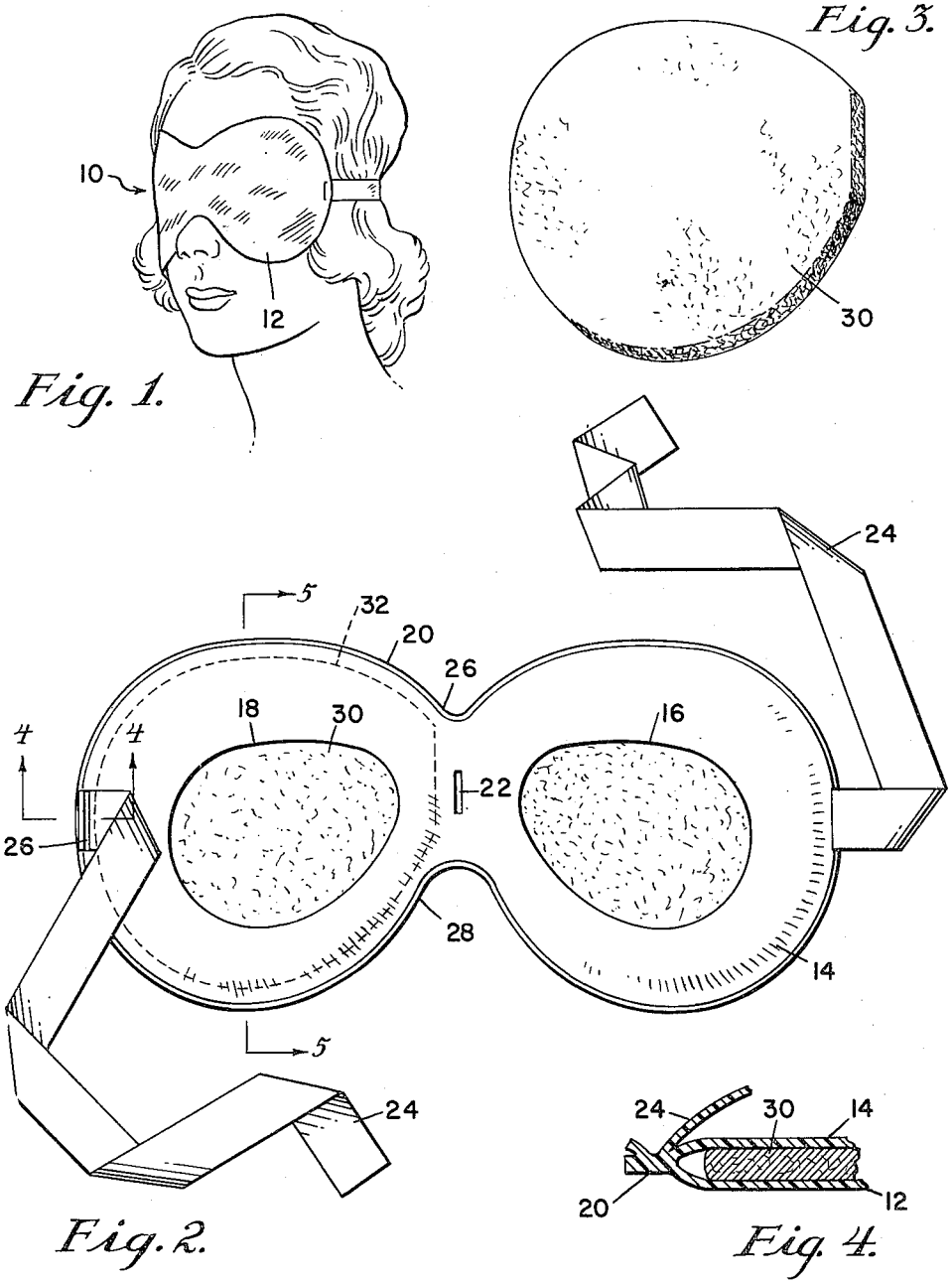
INVENTOR.
HELEN L. SCHMIERER
BY
Caesar and Rivise
ATTORNEYS.

Oct. 9, 1956  H. L. SCHMIERER  2,765,789
EYESHADE APPLICATOR
Filed Oct. 8, 1952  2 Sheets-Sheet 2

INVENTOR.
HELEN L. SCHMIERER
BY Caesar and Rivise
ATTORNEYS.

United States Patent Office 2,765,789
Patented Oct. 9, 1956

2,765,789

EYESHADE APPLICATOR

Helen L. Schmierer, Maple Shade, N. J.

Application October 8, 1952, Serial No. 313,670

3 Claims. (Cl. 128—260)

This invention relates to an eyeshade constructed and designed for use in applying a liquid cosmetic or medicament to the eyeballs, the surrounding tissues and the eyelids.

The primary object of this invention is to provide a light-weight, attractive, moisture-proof shade with removable absorbent eye pads therein whereby a liquid cosmetic, beauty preparation or medicament retained on the eye pads will come into direct contact with the eyes and the surrounding eye tissues and eyelids.

Another object of this invention is to provide an eyeshade construction wherein the liquid drippings from the absorbent pads will not fall on the face and clothing of the wearer, but rather into the waterproof eyeshade itself. In so doing, the drippings will collect as a reservoir in the eyeshade continuously feeding the absorbent pads as a wick. Thus the eye pads remain moist and impart benefit to the eyes for a longer period of time inasmuch as the pads will not readily dry out due to the heat of the body.

A further object of the invention is to provide an eyeshade with removable and disposable eye pads to allow a more hygienic treatment of the eyes.

A further object of the invention is to provide a light-proof and water-proof eyeshade containing eye apertures of such size and shape as to permit exposure not only of the eyeball, but also of the surrounding eye tissues and eyelids to the liquid preparation retained in the absorbent pads which are exposed through the eye apertures.

Yet another object of the invention is to provide an eyeshade which is either flexible or rigid but which at the same time contains soft edges which cannot injure the face. Since it is preferred that the eyeshade be fabricated of lightweight plastics, a rigid eyeshade for particular use after surgery may be provided to withstand accidental bumps against the eyes, but at the same time will not exert excessive pressure on the eyeballs.

Yet another object of the invention is to provide an eyeshade which is functional yet simple in construction and design, light and comfortable when in use, attractive and economical to manufacture in large quantities.

These and other objects of the invention may be attained by the eyeshade, a preferred embodiment of which is shown in the accompanying drawings, wherein:

Figure 1 is an elevational view of the eyeshade when in use;

Figure 2 is an elevational view of the eyeshade looking into the eye apertures;

Figure 3 is a perspective view of a disposable absorbent eye pad used in the eyeshade;

Figure 4 is a sectional view taken substantially on the plane of section line 4—4 of Figure 2;

Specific reference will now be made to the drawings wherein similar reference characters are used for corresponding elements throughout.

Figure 5:
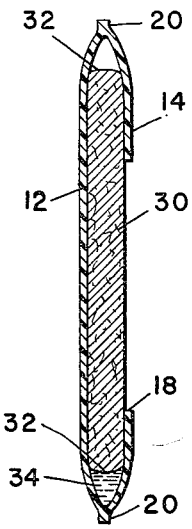
Figure 5 is a sectional view taken substantially on the plane of section line 5—5 of Figure 2.

The invention is generally indicated at 10 and is fabricated of light-weight, light-proof, water-proof, colored or uncolored thermoplastic plastics, such as the vinyl plastics, etc. The plastic materials may also possess any desired design over their surface to improve the attractiveness thereof.

The eyeshade includes a continuous imperforate panel 12 cut to the shape and dimensions shown more particularly in Figures 1 and 2 of the drawings. A second panel 14 is provided which contains two relatively large eye apertures 16 and 18, and which is cut to the same shape and dimensions as the continuous panel 12. The two panels are secured to each other along their outer edges as at 20 and at their centers as at 22, preferably by a heat seal, so that the exposed peripheral edge of the eyeshade is smooth.

A pair of thin ribbons 24, preferably fabricated of the same plastic as the eyeshade are secured as at 26, preferably by heat seal to the edges of the eyeshade, so that the eyeshade can be tied with ease around the head of a person as shown in Figure 1. As is evident from Figure 1, the eyeshade is provided with a cut-out portion 26 at its upper edge and a further cut-out portion 28 at its lower edge to allow proper positioning of the eyeshade on the face in a manner which will avoid excessive wrinkling of the eyeshade. As is shown further in Figure 1, the overall dimensions of the eyeshade are such that it covers a substantial portion of the forehead and cheeks as well as the eyes themselves.

The eye apertures 16 and 18 are of a configuration as shown in Figure 2 and are sufficiently large to encompass not only the eyeballs, but also the surrounding eye tissues and the eyelids.

An absorbent pad 30 is provided preferably of a configuration as that shown in Figure 3 and preferably fabricated of cotton which is removably insertable in the eyeshade thru each eye aperture. Each absorbent pad is of such dimension as to occupy substantially the entire area of the compartment behind each eye aperture as shown at 32.

When the pads 30 are properly inserted in the eyeshade, they will not fall out of the shade regardless of the position in which the shade is held. When the eye pads are soaked with a liquid cosmetic or medicament and the eyeshade is placed on the face as shown in Figure 1, because of the size and shape of the eye apertures 16 and 18, the eyeballs, surrounding tissues and eyelids will be subjected to the cosmetic preparation or medicament retained on the eye pads.

Because the eyeshade is made of a water-proof plastic, the liquid cosmetic or medicament cannot soak through the shade and the dripping from the cotton pads will be retained in the eyeshade as at 34. When this occurs, the eye pads will function as a wick and will remain moist for a prolonged period of time thereby avoiding drying up of the cosmetic preparation or the medicament due to body heat. It will further be noted that the present eyeshade is hygienic because the pads are disposable and the eyeshade itself may be thoroughly washed and reused.

In the modification hereinabove described with reference to Figures 1 to 5, the panels 12 and 14 are of the same thickness and are relatively thin so that the eyeshade will be sufficiently flexible to conform with ease to the contour of the face immediately surrounding the eyes.

In the event that the eyeshade must be worn after surgery, it is necessary that the eyeshade be light in weight so that excessive pressure of the eyeballs will be avoided, but it is also necessary that the shade have sufficient body to withstand accidental thrusts or bumps against the eyes. These functions are accomplished by the modification illustrated in Figures 6 and 7.

Figure 6:
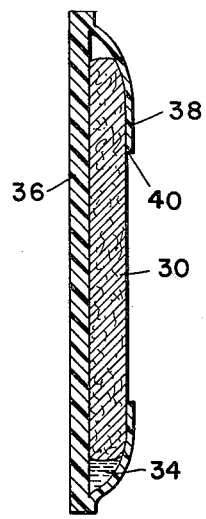
Figure 6 is a sectional view similar to Figure 5 as applied to a modification of the invention.

The eyeshade shown in Figure 6 is identical in every respect with that shown and described with reference to Figures 1 to 5 except that the imperforate outer panel 36 is of greater thickness than the inner panel 38 containing the eye apertures 40. In other words, the inner and outer panels 36 and 38 will be fabricated of the same water-proof plastics and heat sealed along their edges, but the outer panel 36 will be thicker than the inner panel 38, rendering the eyeshade somewhat less flexible and permitting the thicker outer panel 36 to absorb accidental bumps and minimize their transmission to the eyeballs.

Figure 7:
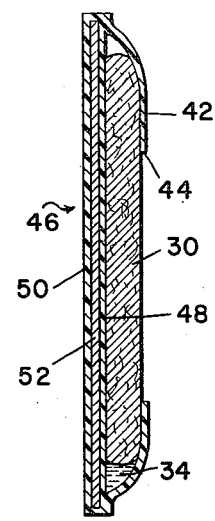
Figure 7 is a sectional view similar to Figure 5 as applied to another modification of the invention.

The construction shown in Figure 7 is somewhat superior to that shown in Figure 6 with respect to the absorption of accidental thrusts or bumps against the eyes where the shade is to be used after surgery. In this construction, the inner panel 42 having the eye apertures 44 is fabricated of a relatively thin, water-proof plastic and is heat sealed around its edges to an outer imperforate plastic panel 46 which is itself comprised of an inner plastic panel 48 and an outer plastic panel 50 spaced therefrom with a stiffening panel 52, preferably fabricated of cardboard or similar material, occupying the space between the said inner and outer panels 48 and 50.

Figure 8:
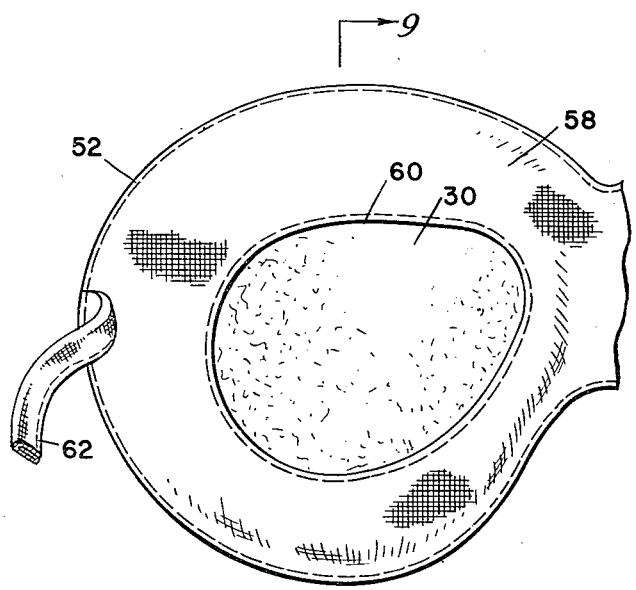
Figure 8 is an enlarged fragmentary elevational view of another form of the invention.
Figure 9:
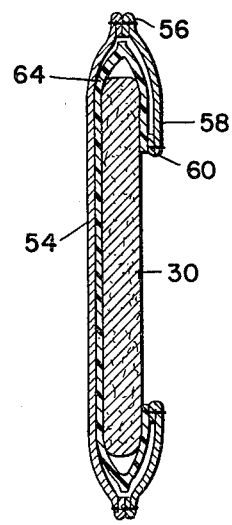
Figure 9 is a sectional view taken substantially on the plane of section line 9—9 of Figure 8.

In the modification shown in Figures 8 and 9, a cloth or satin shade is employed which includes a continuous outer panel 54 sewn around its peripheral edge as at 56 to an inner panel 58 which is provided with spaced eye apertures 60. The shape and dimensions of this eyeshade and the apertures are approximately the same as those of the modifications previously described. The tying ribbons of this modification may be of cloth or satin as shown at 62 and the ribbons may be sewn or otherwise secured to the opposite edges of the eyeshade.

To prevent the drippings of the absorbent pad 30 from falling on the face and clothing of the wearer and to maintain the wick effect of the liquid cosmetic or medicament in the eyeshade, the cloth or satin eyeshade is provided with a plastic liner 64 which, as shown in Figure 9, lines the inner face of the outer and inner panels 54 and 58. Thus the eye pad 30 will bear against this plastic, water-proof liner and the liquid drippings thereof will be retained in the eyeshade.

While preferred embodiments of the invention have been shown and described hereinabove, it will be understood that minor variations may be made by those skilled in the art without departing from the spirit of the invention and the scope of the appended claims.

I claim:

1. A hygienic eyeshade comprising an outer continuous, imperforate, water and light proof, flexible plastic panel, an inner, water and light proof flexible panel secured along its entire outer edge to the edge of said outer panel, said inner panel including spaced continuous inner edges unsecured to said outer panel forming spaced eye apertures sufficiently large to encompass the eyeballs, surrounding eye tissues and eyelids, absorbent pads for retaining liquid preparations removably and securely held solely by and between said inner and outer panels and having portions exposed through said eye apertures, and means carried by at least one of said panels for holding the eyeshade in place on a person.

2. A hygienic, light and water proof eyeshade comprising an outer continuous panel, an inner panel of the same shape and dimensions of said outer panel and including an outer edge secured along its entire length to the edge of said outer panel and spaced continuous inner edges unsecured to said outer panel, said spaced continuous inner edges of said inner panel defining spaced eye apertures, absorbent pads for retaining liquid preparations securely and removably held solely by and between said inner and outer panels and having portions exposed through said eye apertures, and means carried by the eyeshade for holding the same in place on a person.

3. A hygienic, light and water proof eyeshade comprising an outer continuous panel, an inner panel of the same shape and dimensions of said outer panel and including an outer edge secured along its entire length to the edge of said outer panel and spaced continuous inner edges unsecured to the said outer panel, said spaced continuous inner edges of said inner panel defining spaced eye apertures, sufficiently large to encompass the eyeballs, surrounding tissues and eyelids, absorbent pads for retaining liquid preparations securely and removably held solely by and between said inner and outer panels and having portions exposed through said eye apertures, and means carried by the eyeshade for holding the same in place on a person.

References Cited in the file of this patent

UNITED STATES PATENTS

| 1,886,725 | Pedersen | Nov. 8, 1932 |
| 2,342,840 | Cadous | Feb. 29, 1944 |

FOREIGN PATENTS

| 841,203 | Germany | June 13, 1952 |